United States Patent [19]
Eriksson

[11] Patent Number: 5,533,073
[45] Date of Patent: Jul. 2, 1996

[54] METHOD AND AN ARRANGEMENT FOR MINIMIZING A PHASE DIFFERENCE BETWEEN TWO DATASTREAMS PRIOR TO CHANGEOVER

[75] Inventor: Karl Ö. Eriksson, Askim, Sweden

[73] Assignee: Telefonaktiebolaget LM Ericsson, Stockholm, Sweden

[21] Appl. No.: 141,091

[22] Filed: Oct. 26, 1993

[30] Foreign Application Priority Data

Oct. 26, 1992 [SE] Sweden .................................. 9203126

[51] Int. Cl.$^6$ ...................................................... H04L 7/00
[52] U.S. Cl. ........................... 375/371; 327/161; 375/260
[58] Field of Search ..................................... 375/110, 118,
375/119, 120, 40, 100, 371, 372, 373, 376,
260; 307/590, 592, 597; 328/109, 115,
129.1, 133; 455/132, 135; 327/50, 161,
141

[56] References Cited

U.S. PATENT DOCUMENTS 4,827,490  5/1989  Guérin ..................................... 375/111
5,077,761  12/1994 Takunaga ................................ 375/118

FOREIGN PATENT DOCUMENTS 249930   12/1987  European Pat. Off. .
374562   6/1990   European Pat. Off. .
454249   10/1991  European Pat. Off. .

Primary Examiner—Stephen Chin
Assistant Examiner—Tesfaldet Bocure
Attorney, Agent, or Firm—Burns, Doane, Swecker & Mathis

[57] ABSTRACT

A method and an arrangement for effecting a smooth or undisturbed changeover between at least two binary datastreams, by minimizing the phase difference between the datastreams prior to changeover. The datastreams are fed into a phase-synchronizing arrangement, where each datastream passes through a respective delay unit and is passed further to a switch device. According to the invention, the datastreams are tapped to a control unit which is connected between the delay units and the switch device and in which a determined number of random samples are taken from the datastreams. The binary amplitudes of the samples are compared mutually in an amplitude comparison circuit, whereafter a mean value of those samples that have mutually the same binary amplitudes is formed in a mean value forming circuit. The result obtained in the mean value forming circuit forms an actual value, which is compared in a comparison circuit with a predetermined reference value. One of the datastreams is thereafter delayed and a new phase-synchronization process is commenced. Alternatively, if the comparison shows that the actual value at least substantially corresponds to the reference value, a changeover between the datastreams can take place.

16 Claims, 5 Drawing Sheets

METHOD AND AN ARRANGEMENT FOR MINIMIZING A PHASE DIFFERENCE BETWEEN TWO DATASTREAMS PRIOR TO CHANGEOVER

BACKGROUND

The present invention relates to a method of effecting a smooth changeover between at least two binary datastreams, by minimizing the phase difference between the datastreams prior to changeover, said method comprising the steps of:
Feeding the datastreams into a phase synchronizing device.
Comparing the binary amplitude of respective datastreams.
Determining a value of the phase difference between said datastreams.
Delaying the datastreams in relation to one another until acceptable phase similarity is achieved.
Effecting changeover between the datastreams.

The invention also relates to an arrangement for carrying out the method.

When transmitting data between a transmitter and a receiver unit, redundant transmission is essential if reliability is to be achieved. By redundant data transmission is meant in this particular case the transmission of two similar datastreams to one and the same receiver from one and the same transmitter, although by means of different transmission devices. The object of this type of redundant transmission is to enable the receiver to switch to a more favourable transmission device in the event of a disturbance in or malfunction of one of the transmission devices.

In order to achieve smooth or undisturbed changeover between two binary datastreams without losing data bits, it is necessary for the two datastreams to be essentially in phase with one another at the time of the changeover. Prior publication EP 249,930 discloses a method and an arrangement for synchronizing two binary datastreams prior to changeover. According to the known method, each of the two datastreams is blocked in a respective memory buffer and the datastreams are led from the outputs of said buffers to an amplitude comparison circuit. Depending on the output signal of the amplitude comparison circuit, it is possible to prevent the infeed of data into one of the buffers until satisfactory phase similarity is achieved between the datastreams leaving the buffers, whereafter a changeover between these datastreams can take place. One problem with this known technique is that phase synchronization prior to changeover must be divided into two sequences, namely a sequence in which one datastream is delayed until phase similarity is achieved and a second sequence in which the original data rate is recreated. Furthermore, when practicing the known technique, it is necessary to process data at a speed which corresponds to the speed at which the incoming datastreams are transmitted. This results in an unnecessarily expensive and complex arrangement consisting of expensive, high performance components which are necessitated to operate at a speed which is at least equally as high as the transmission speed of the binary datastreams.

SUMMARY

The aforesaid problem is solved in accordance with the invention by passing two binary datastreams through a phase-synchronizing arrangement at an unchanged bit speed. The datastreams are drained to a control unit included in the phase-synchronizing arrangement, where a predetermined number of random samples are taken from the datastreams or bits from the datastreams are fed into the phase-synchronizing arrangement over a predetermined period of time. The random samples/bits are then processed at a rate which may be lower than the bit speed of the datastreams. This processing procedure involves comparing the mutual phases of the two binary datastreams. The control unit then delays one datastream in relation to the other until satisfactory phase similarity is achieved, i.e. until predetermined proportions of the amplitude of the random samples/bits are instantaneously equal. Changeover between the datastreams can then take place.

The invention will now be described in more detail with reference to preferred exemplifying embodiments thereof and also with reference to the accompanying drawings.

DETAILED DESCRIPTION

Figure 1:
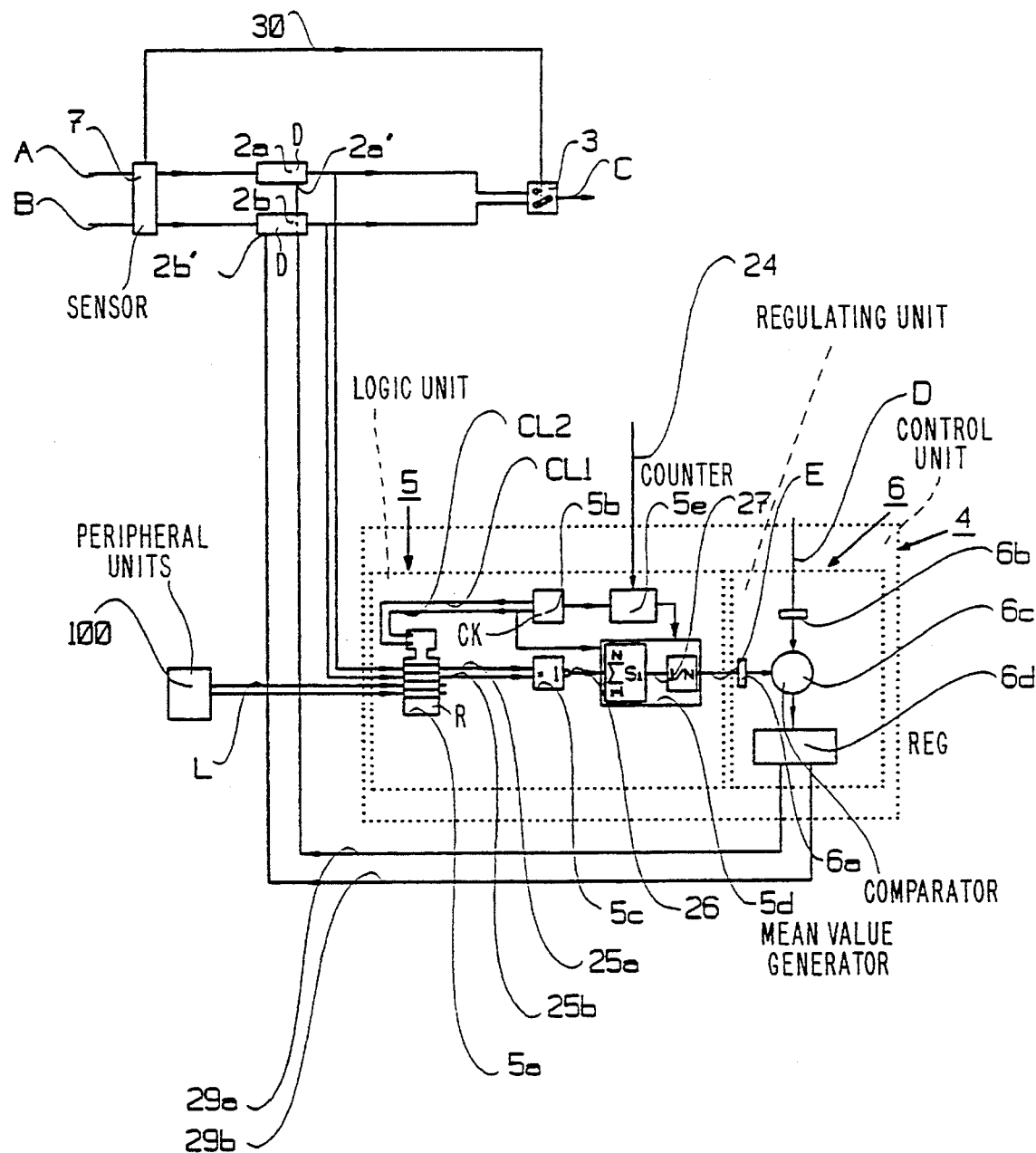
FIG. 1 is a diagrammatic illustration of a phase-synchronizing arrangement, where a predetermined number of random samples are taken from two binary datastreams prior to phase synchronization.
Figure 2:
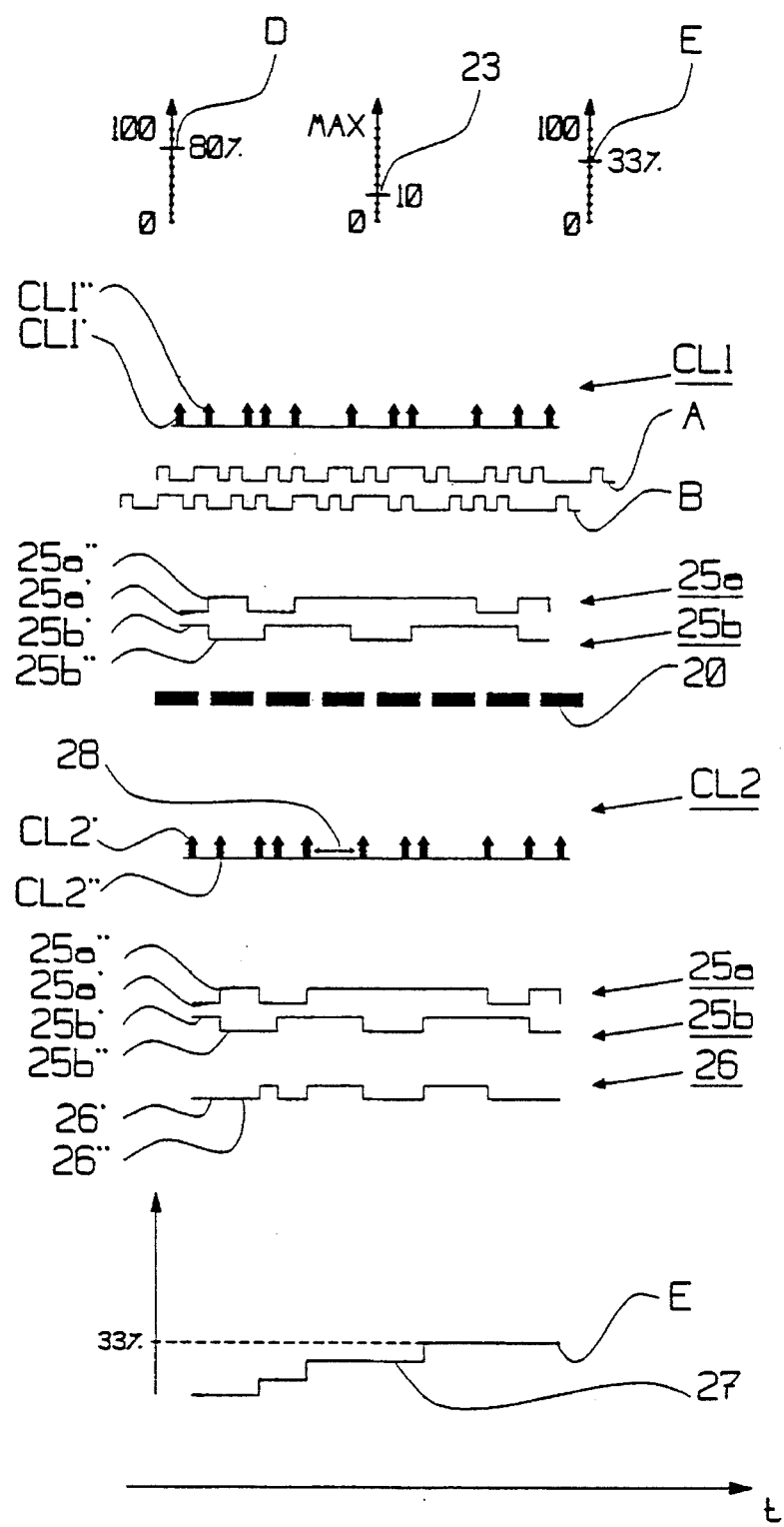
FIG. 2 illustrates diagrammatically a phase-synchronizing method where a predetermined number of random samples are taken from two binary datastreams prior to phase synchronization.
Figure 3:
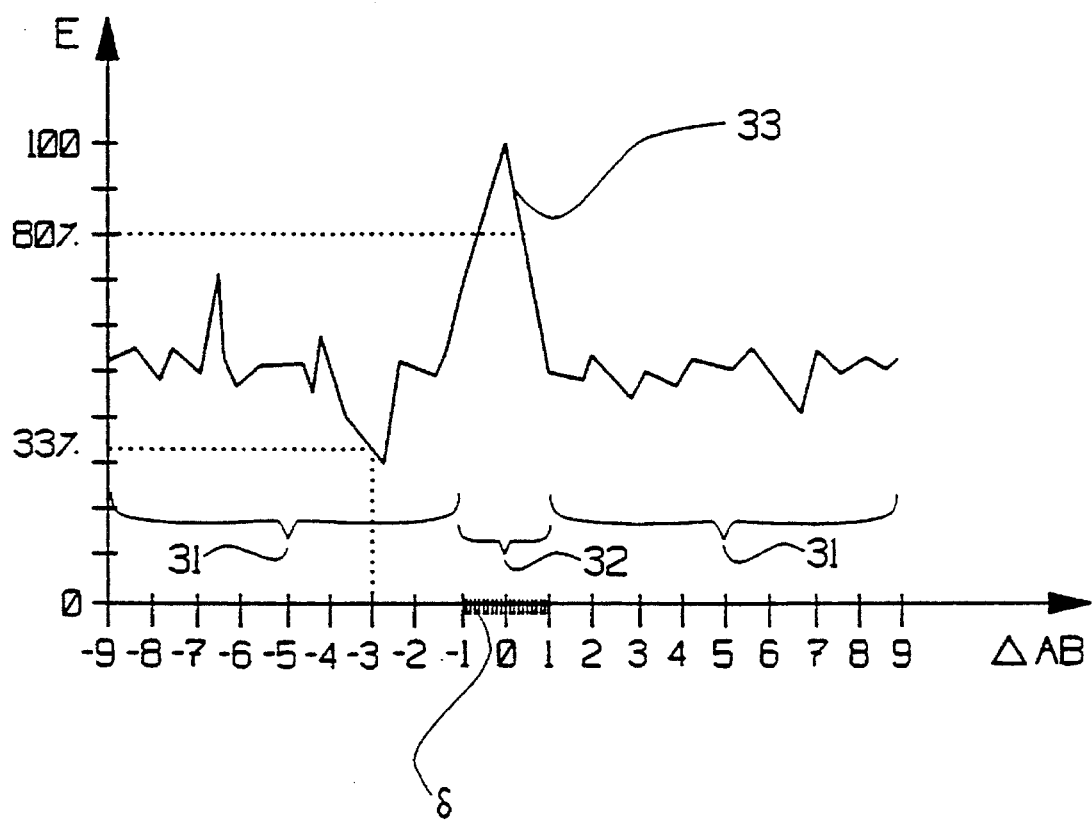
FIG. 3 illustrates a phase-synchronizing process in greater detail.

FIG. 1 illustrates an inventive phase-synchronizing arrangement in which two binary datastreams A, B serve as input signals. The datastreams consist in so-called non-trivial patterns, i.e. streams in which a certain bit pattern is not continuously repeated or does not repeat at very long intervals. The phase synchronizing arrangement includes a delay unit $2a$, $2b$ connected to each datastream, and each of the outputs of respective delay units is connected to the input of a switch 3. Each of the delay units $2a$, $2b$ incorporates an individually variable delay and a respective control input $2a'$ and $2b'$. The magnitude of the delay can be controlled with a respective signal $29a$ and $29b$ applied to the control input. The switch includes an output to which one of the datastreams is led, depending on the position of the switch. A binary datastream C consisting in one of the incoming datastreams A, B exits from the switch and functions as an output signal from both the switch 3 and the phase-synchronizing arrangement. In this case, the bit speed of the output signal C is the same as the bit speed of the incoming datastreams. The phase-synchronizing arrangement also includes a control unit 4 to which the two datastreams A, B are drained, this control unit having the form of a microprocessor in the case of the illustrated embodiment. Two of the inputs of the control unit are connected between the outputs of the delay units $2a$, $2b$ and the inputs of the switch 3. The control unit includes a logic unit 5 and a regulating unit 6, where two of the logic unit inputs are connected to the earlier mentioned control unit inputs. The logic unit 5 includes a register $5a$, a clock generator $5b$, an inverted Exclusive/Or gate $5c$, a mean value generating circuit $5d$ and a counter $5e$. Random samples are fed from the binary datastreams into the register 5a with the aid of a first clock signal CL1 from the clock generator 5b, and the random samples are fed from the register with the aid of a second clock signal CL2. The random samples are fed into the register 5a simultaneously with the feed-in of other signals, for instance alarm signals L from peripheral units 100, such as temperature monitoring units, these latter units playing no part in the actual datastream changeover process. As shown in FIG. 2, the random samples are read from the register 5a by the second clock signal CL2 at time points when the microprocessor 4 is not loaded with other tasks, thereby enabling a pulse interval 28 between each sampling time point to be varied. This enables the pulse interval 28 to take values which exceed the duration of a bit, therewith reducing the speed at which the subsequent data processing circuits need operate. The number of random samples taken is determined with the aid of a so-called number signal 24 applied to a counter 5e. Each time random samples are taken from the register 5a with the aid of the second clock signal CL2, the counter 5e is caused to count down the number value by one step with the aid of the clock generator 5b. At the same time, the clock signal CL2 is applied to the mean value generating circuit 5d, where it activates the circuit 5d after a short delay and causes the circuit to detect an incoming value from the Exclusive/Or gate 5c, as described in more detail herebelow. When the last random sample has been taken from the counter, the counter will return to the original number 23 of samples, which number will be explained later. The predetermined number of random samples taken from the datastreams A, B together form two random sample signals 25a, 25b. The random sample signals on the outputs of the register 5a are applied to the two inputs of the Exclusive/Or gate 5c. The Exclusive/Or gate marks the random samples when the binary amplitudes of the two incoming signals are mutually different, by sending the potential "low" to the gate output. By binary amplitude is meant here the logic level of a bit. Similarly, the Exclusive/Or gate marks the random samples when the binary amplitude of the two incoming signals is equal, by sending the potential "high" to the gate output. The output signal of Exclusive/Or gate 5c is hereinafter called a similarity signal 26. The predetermined number of random samples in the similarity signal in which the potential "high" has been assumed are summed in a mean value generating circuit 5d. A binary actual value E is formed from a resultant proportion signal 27 as a measurement of the magnitude of the proportional number of random samples taken. The actual value E is formed in the mean value forming circuit 5d, by dividing the proportion signal 27 with the number of random samples taken so as to obtain a proportional value. The actual value is then read into an actual value register 6a included in the regulating unit 6. The regulating unit functions in accordance with a known regulating algorithm, by comparing the actual value E with a predetermined binary control or reference value D which is stored in a reference register 6b included in the regulating unit 6. Subsequent to comparison in a comparison circuit 6c, the regulating unit is able to influence the delay units 2a, 2b with two output delay signals 29a, 29b produced by a regulated 6d. The first of the datastreams A is delayed by one of the delay units 2a in the manner described below. As illustrated in FIG. 3, a reduction in phase difference ΔAB between the two incoming datastreams A, B is effected, so that the actual value E will approach the reference value D. Satisfactory phase similarity is considered to be achieved when the actual value is essentially the same as the reference value, and a changeover between the datastreams can now take place. This changeover is effected in response to a changeover signal 30 delivered by a sensor 7 coupled to each datastream A, B. The sensor senses the signal quality of the two datastreams, which in the case of the present embodiment involves evaluating the parity sums of the datastreams. When the parity sum of the other datastream B used at that moment does not correspond to the expected value, a comparison is made between the signal qualities of the datastreams A, B. If the first datastream A has the expected value, the signal 30 is sent from the sensor 7 to the switch 3, resulting in a switch to the first datastream A.

It will be understood that other components can be selected in the aforedescribed arrangement, provided that the concept of the invention is retained. For instance, the random samples can be read from the register 5a with the aid of a continuous "low" so-called latch-signal instead of the clock pulse CL2. Other types of circuits than the aforedescribed register 5a can be used to take random samples from the datastreams, for instance such circuits as sample/holding circuits which may be located outside the microprocessor 4.

FIG. 2 illustrates an inventive method which uses the aforedescribed phase-synchronizing arrangement shown in FIG. 1. A first step of the inventive method entails determining the reference value D. The reference value is a measurement of the maximum permitted phase shift between the datastreams A, B. The reference value D is represented physically by a binary number which can take a value between 0 and 100%. The binary number is stored in the reference value register 6b of the regulating unit 6 and represents a desired proportion of a predetermined number of random samples taken from the two datastreams A, B, the samples included in said proportion, or part, having mutually the same binary amplitude. The value 100% signifies the desired complete phase agreement between the two datastreams. As will be seen from FIG. 2, the reference value D has been determined as 80% in the illustrated embodiment. A second step of the inventive method entails determining the proportional value 23 of the aforesaid number of random samples that shall be taken prior to each evaluation of phase similarity. For the sake of clarity, the proportion value has been chosen as ten in the illustrated embodiment, although a more realistic value will lie between five hundred and ten thousand. A third step of the inventive method entails determining those time points at which random samples shall be taken from the two datastreams. These time points are determined by the microprocessor 4, which generates said time points in response to pulses received from the clock generator 5b. The pulse interval 28 between said time points may vary in accordance with the working load on the microprocessor, i.e. random samples are taken from the two data streams as soon as the microprocessor is not occupied with other tasks. The length of the duration of one bit is the smallest time interval between sequential random samples. A fourth step of the inventive method entails a random sampling process which will now be described in more detail. FIG. 2 illustrates the two incoming binary datastreams A, B, where the first datastream A is phase-shifted through three bits in relation to the second datastream B. The two datastreams are drained to the control unit 4 and enter the register 5a in the logic unit 5, as described above. In conjunction with reading an alarm status L from the external units 100 into the register 5a of the microprocessor 4, random samples taken from the binary datastreams A, B are also fed into said register. This input process is effected continuously in conjunction with the execution of preprogrammed sequences in the processor with the aid of the first clock signal CL1, and the register read-out process is effected with the aid of the second clock signal CL2 at time points at which the processor is not occupied with other tasks. The delay between feed-in and read-out is marked in FIG. 2 by a partition line 20 between the two processes. A random sample 25a' and a random sample 25b' are each taken from a respective binary datastream A, B upon the occurrence of a first clock pulse CL1' in the first clock signal CL1, land are fed into the register 5a. The random sample 25a' taken from the first binary datastream A is taken from the register 5a and applied to the Exclusive/Or gate 5c upon the occurrence of a first clock pulse CL2' in the second clock signal CL2. The binary amplitude of the datastream A was "low" when feeding the sample into the register 5a with the aid of clock pulse CL1' resulting in a "low" value of the sample 25a'. Upon the occurrence of the clock pulse CL2', the random sample 25b' taken from the second datastream B is taken or read from the register 5a, the binary amplitude of this datastream being "high" when the sample 25b' was fed into the register with the aid of the clock pulse CL1' therewith resulting in a "high" value for the sample 25b'. Further samples 25a" and 25b" are fed into the register 5a with the aid of a second clock pulse CL1" in the first clock signal CL1, during the time between the first clock pulse CL2' and said second clock pulse CL2" in the second clock signal CL2. Upon the occurrence of the second clock pulse CL2" in the second clock signal CL2, the sample 25a" taken from the first binary datastream A is read from the register 5a, the binary amplitude of the first binary datastream A being "high" when the sample was fed into the register, therewith resulting in a "high" value of the random sample 25a". Upon the occurrence of the clock pulse CL2", the sample 25b" taken from the second datastream B is read from the register, the binary amplitude of the second datastream B being "low" when feeding the sample 25b" into said register, therewith resulting in a "low" value of the sample 25b". After reading-out all ten samples, the combined effect results in the two random sample signals 25a, 25b illustrated in FIG. 2. Each of the two random sample signals is passed from respective register outputs to an individual input on the Exclusive/Or gate 5c, as earlier described. The similarity signal 26 is created in the Exclusive/Or gate, by mutually comparing the binary amplitudes of the two random samples. Generating the similarity signal 26 constitutes a fifth step of the inventive method. The Exclusive/Or gate compares all random samples in the two random sample signals 25a, 25b derived from the two datastreams A, B. When two random samples taken from different datastreams at the same time have the same binary amplitude, the result is a "high" output value from the gate 5c, whereas when two random samples have mutually different binary amplitudes, the gate output value is "low". In the FIG. 2 embodiment, the first sample 25a' of the samples contained in the random sample signal 25a from the first datastream A is compared with the first sample 25b' of the samples contained in the random sample signal 25b from the second datastream B. Since the two random samples have different values in this case, the result from the Exclusive/Or gate 5c will be a "low" value over the duration of the random samples 25a', 25b'. The second sample 25a" taken from the first datastream A is then compared with the second sample 25b" taken from the second datastream B. Since the two samples have mutually different values also in this case, the result from the Exclusive/Or gate is a "low" value over the duration of the samples 25a", 25b", as shown in FIG. 2. Subsequent to comparing all random samples contained in the two random sample signals 25a, 25b taken from the two binary datastreams, the combined effect will result in the similarity signal 26 on the output of the Exclusive/Or gate. A sixth step of the inventive method entails summing those parts of the similarity signal 26 in which the signal has taken a "high" value. This summation process results in a proportion signal 27 from which there is formed an actual value E. The actual value E represents the proportional number of all samples in the two random sample signals 25a, 25b with which the amplitude is simultaneously "high". Thus, as shown in FIG. 2, the actual value E is a proportional measurement of the proportional number of random samples taken from the two datastreams A, B that have mutually the same binary amplitude. In the exemplifying embodiment illustrated in FIG. 2, the actual value E is 33% and this value is sent to the actual value register 6a in the regulating unit 6 from the output of the control unit 5. The actual value E is compared in the comparison circuit 6c of the regulating unit with the reference value D earlier stored in the reference value register 6b, this comparison forming a seventh step of the inventive method. As will be described in more detail herebelow, subsequent to this comparison, the regulating unit 6 activates one of said delay units with an output signal 29a, this activation constituting an eighth step of the inventive method.

FIG. 3 illustrates a so-called rough adjustment 31 of the phase difference ΔAB. This adjustment is continued until the first datastream A has essentially the same phase as the second datastream B, i.e. until the actual value corresponds at least to the reference value. As shown in FIG. 3, the actual value E is changed as a function of the delay of the first binary datastream A. The Figure shows the pronounced change in the actual value in the curve peak 33, at which the first datastream A has essentially the same phase as the second datastream B. When this occurs, a so-called fine adjustment 32 is made, by delaying the first datastream A in steps δ of tenths of the duration of one bit. This is effected in the aforedescribed manner and is continued until the actual value E corresponds to the reference value D with the accuracy afforded by the fine adjustment, i.e. until the phase difference expressed in parts of a bit is equal to or close to zero. When the actual value E is substantially the same as the reference value D, a changeover can be effected as described in the earlier example, this changeover constituting a ninth step of the inventive method. The regulation of a system which is not locked, i.e. in which the actual value is smaller than the reference value, is effected by the regulating unit 6 delaying that datastream, in this case datastream A which is not selected, to a start value at that time. This start value is determined with a starting point from the type of data transmission used, so that the delayed datastream will definitely lie behind the other datastream. A measuring process is started and if the actual value E is smaller than the reference value D, the regulating unit 6 will order the delay unit 2a to reduce its delay by a length of time corresponding to the duration of a bit on the datastream A, whereafter a new measuring process is initiated. This process is repeated until the actual value is greater than or equal to the reference value and the two datastreams are in mutually the same phase, as near as at most one bit. The regulating unit 6 then orders the delay unit 2a either to reduce or to increase the delay in the steps δ corresponding to one-tenth of the duration of a bit, so as to make a fine adjustment within said bit. The subsequently obtained actual values are saved. The process is repeated until the highest actual value has been detected. The regulating unit then increases and decreases the delay alternately by one-tenth of the duration of a bit, and measures and compares the actual values so as to ensure that the best adjustment has been made. The inventive method is thus a continuous process which continues the whole time both before and after the changeover. Normally, the rough adjustment 31 need only be made when starting-up, whereafter the datastreams A, B are adjusted by the fine-adjustment process 32.

The aforedescribed delay control may, of course, be modified. The earlier described steps in the rough and fine adjustment processes may have other values. For instance, when making the rough adjustment, the whole of the interval may be stepped through and all "maxima" of the actual value detected, and thereafter investigated them one by one. It is also feasible to use more than one fine adjustment and therewith further reduce the difference between the final actual value and the reference value.

Figure 4:
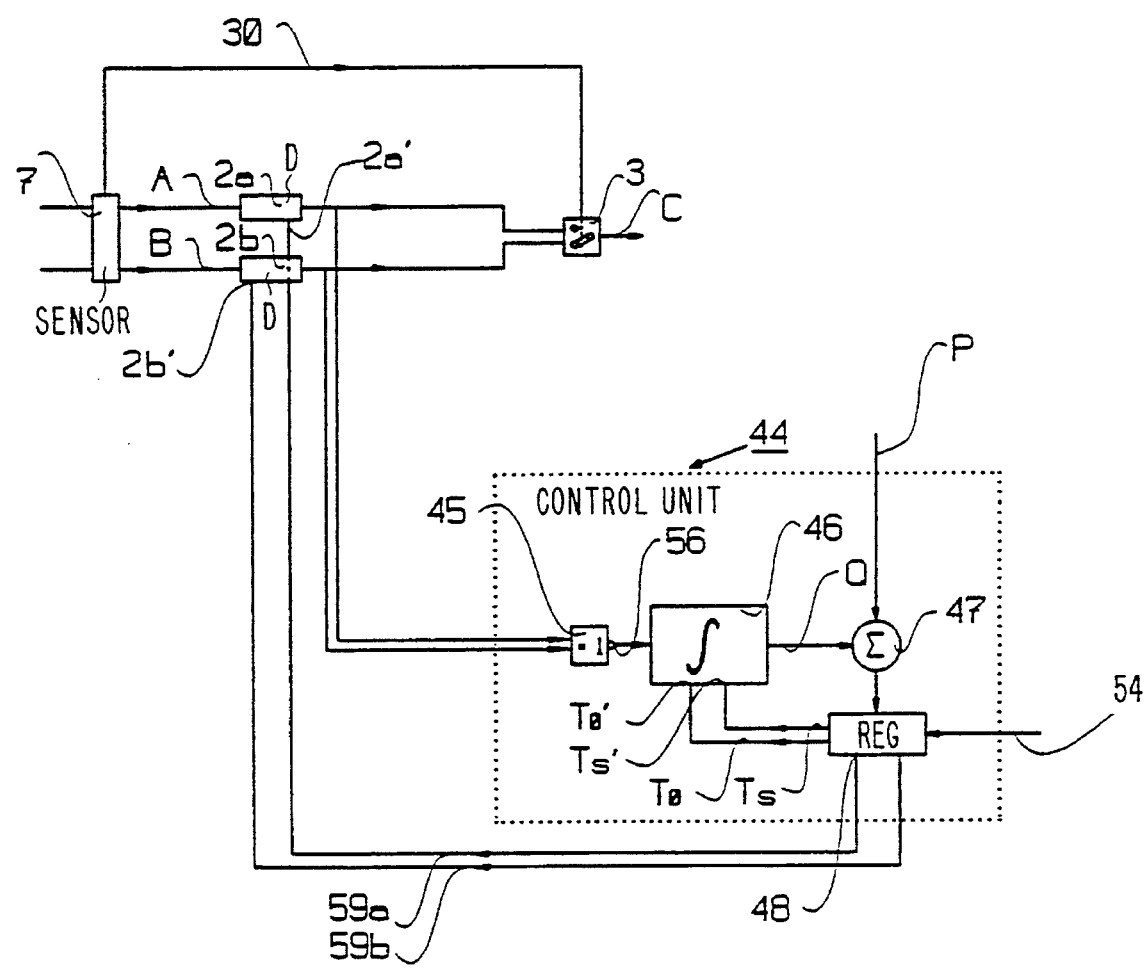
FIG. 4 illustrates diagrammatically a phase-synchronizing arrangement where two binary datastreams are compared at predetermined time intervals prior to phase synchronization.

FIG. 4 illustrates another inventive phase-synchronizing arrangement. The sensor 7, delay devices 2a, 2b and the switch 3 illustrated in FIG. 4 have the same functions as those described in the earlier embodiments. The phase-synchronizing arrangement includes a control unit, which in turn includes an inverted Exclusive/Or gate 45, a summation circuit 46, a comparison circuit 47 and a regulating unit 48. The two datastreams A, B are tapped to the control unit and passed to the two inputs of the Exclusive/Or gate. When the two incoming datastreams have mutually different binary amplitudes, the Exclusive/Or gate 45 marks the bits by sending the potential "low" to the gate output. Similarly, the Exclusive/Or gate marks the bits when the two incoming datastreams have mutually the same binary amplitudes, by sending the potential "high" to the gate output. The signal on the output of the Exclusive/Or gate 45, this signal referred to hereinafter as the similarity signal 56, is sent to the summation circuit 46 which sums the part-intervals whose binary amplitude is "high" over a predetermined time interval 53 of duration T, in accordance with FIG. 5, so that each part-interval in the similarity signal 56 whose binary amplitude is "high" will raise a voltage potential on the output of the summation circuit. The time interval 53 is created in the regulating unit 48 with the aid of a so-called time signal 54 incoming to the regulating unit, so that the regulating unit is able to set to zero the output voltage potential of the summation circuit by sending a first pulse T0 to a zero setting input T0' of the summation circuit 46 at the beginning of the time interval, and so that the regulating unit is able to read the ultimate result from the summation circuit after the summation process, by sending a second pulse Ts to a write input Ts'. For the sake of clarity, the time interval 53 in the illustrated embodiment has been chosen as the time which corresponds to the duration of thirty-five bits, although a more realistic value would be the duration between five-hundred and ten-thousand bits. In this instance, the result obtained from the summation circuit 46 upon completion of the summation process is a d.c. voltage signal, hereinafter called the actual value Q, this actual value presenting the number of bits in the two datastreams which simultaneously have mutually the same binary amplitude during said time interval. The actual value is passed to the comparison circuit 47, where it is compared with a further d.c. voltage signal, hereinafter referred to as the reference value P, this reference value being a predetermined measurement of the desired number of bits in the two datastreams that simultaneously have mutually the same binary amplitude during said time interval. The result obtained from the comparison circuit is passed to the regulating unit 48, which influences the delay units 2a, 2b with the aid of two outgoing signals 59a, 59b in accordance with the pattern described with reference to the earlier embodiments. One of the delay units, delay unit 2a, delays the first datastream A so as to reduce the phase difference between the two incoming datastreams A, B and the actual value Q will therewith approach the reference value P. Satisfactory phase similarity is considered to exist when the actual value is essentially the same as the reference value, wherewith a changeover between the datastreams A, B can take place in accordance with the pattern described with reference to the earlier embodiments.

Figure 5:
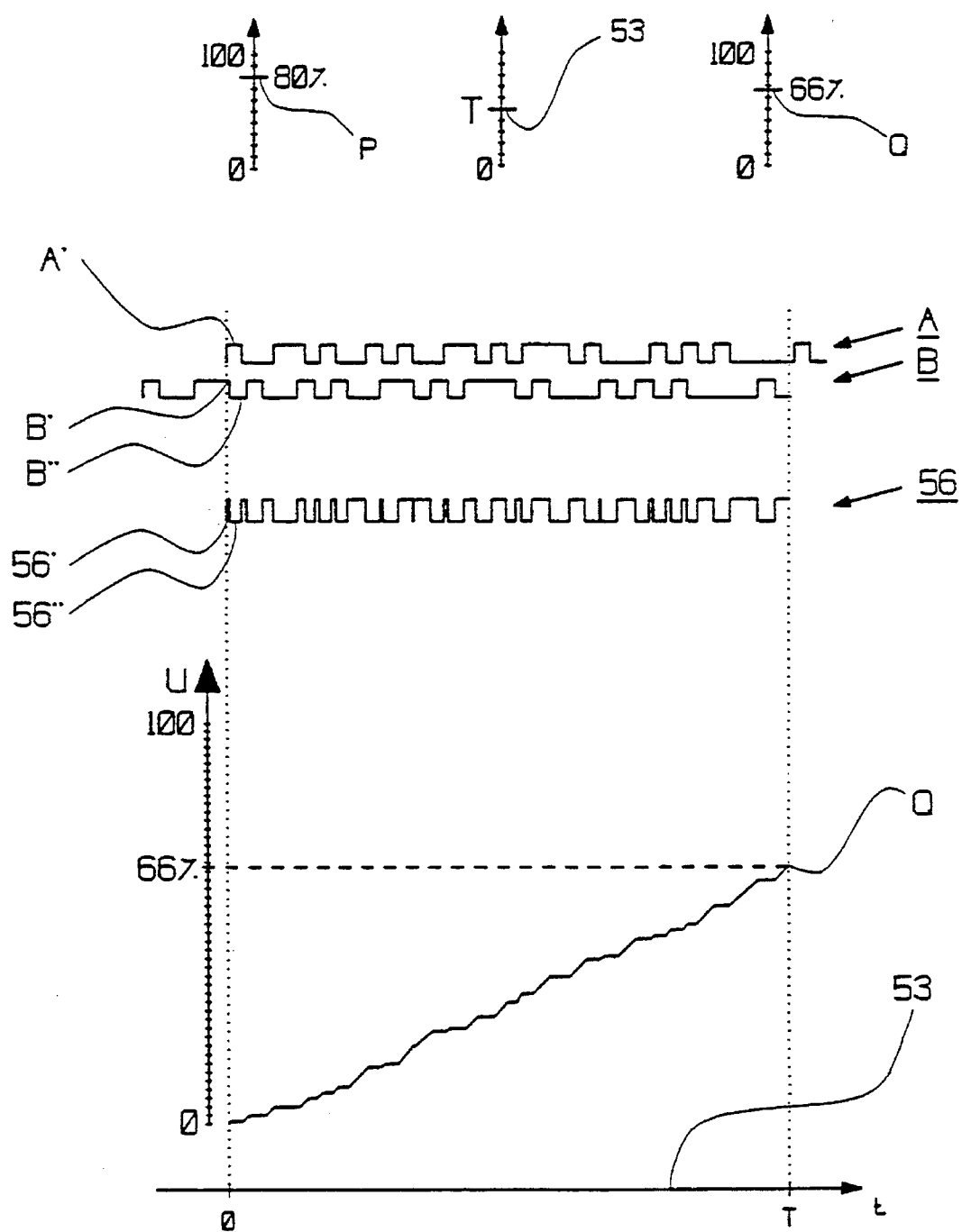
FIG. 5 illustrates diagrammatically a phase-synchronizing method in which two binary datastreams are mutually compared over a predetermined time interval prior to phase synchronization.

FIG. 5 illustrates an inventive method in which the phase-synchronizing arrangement earlier described with reference to FIG. 4 is used. A first method step entails determining the reference value P. The reference value is a measurement of the maximum permitted phase shift between the datastreams A, B, and is represented physically by a d.c. voltage value which shows a proportion in percent of the total number of bits within the earlier mentioned time interval 53 that have mutually the same binary amplitude. As before mentioned, the reference value of the FIG. 5 embodiment is expressed in percent and the value 100% denotes full phase agreement between the two datastreams. The reference value P of this embodiment has been determined as 80%. A second step of the inventive method entails determining the time interval 53. The time interval denotes the time during which the binary amplitudes of the two datastreams A, B shall be compared and is formed with the aid of the so-called time signal 54 which is fed to the regulating unit 48 in the form of a d.c. voltage. The time interval 53 is proportional to the amplitude of the time signal. A third step of the inventive method entails comparing the binary amplitude of the two datastreams. The two binary datastreams are each passed to a respective input of the Exclusive/Or gate 45, in which the similarity signal 56 is formed by comparison of the amplitudes of all bits in the two random samples during the time interval 53. When two bits from the same time period have mutually the same binary amplitudes, the result is a "high" output value on the gate 45, whereas when two bits from the same time period have mutually different binary amplitudes, the result is a "low" output value on said gate. At the beginning of the time interval 53, at the time t= 0, a first bit A' taken from the first datastream A is compared with a first bit B' taken from the second datastream B at the time point. When these two bits have mutually the same binary amplitude, the result from the Exclusive/Or gate is a part-interval 56' having the value "high" during the time lapse between the beginning of the time interval to the end of one of the aforesaid bits A', B', this bit being the bit B' in the illustrated example. The first bit A' from the first datastream A is then compared with a second bit B" from the second datastream B. Since the bits, in this case, have mutually different values, the result from the Exclusive/Or gate will be a part-interval 56" with the value "low" during the time period up to the end of the aforesaid bits A', B", the bit being the bit A' in the illustrated example. Subsequent to comparing all bits from the two binary datastreams during the time interval 53, the combined effect results in a similarity signal 56 on the output of the Exclusive/Or gate. A fourth step in the method entails summing the parts in the similarity signal when said signal has assumed the value "high". At the beginning of the time interval, i.e. at time t= 0, the summation circuit 46 is set to zero by the first pulse T0 delivered by the regulating unit 53 of the FIG. 4 embodiment, whereafter summation of the aforesaid parts in the similarity signal is commenced. This summation of said parts continues throughout the whole of the time interval, i.e. until the end time t= T is reached, which occurs when the second pulse Ts is delivered to the summation circuit 46 from the regulating unit 48. The result obtained by the summation circuit is read therefrom in conjunction with transmitting the second pulse Ts, this result having the form of a d.c. voltage U which is proportional to that number of bits of all the bits in the time interval 53 which have taken the value "high". This d.c. voltage is hereinafter referred to as the actual value Q and is shown to assume the value of 66 percent of a maximum d.c. voltage, and is passed from the summation circuit 46 to the comparison circuit 47, where it is compared with the aforedescribed reference value P, this comparison constituting a fifth step of the inventive method. The result of the comparison between the actual value Q and the reference value P is sent to the regulating unit 48 which produces an output signal 59a which activates one delay unit, 2a, connected with the first datastream A. This activation of said delay unit has been described earlier with reference to FIG. 3 and constitutes a sixth step of the inventive method. When the actual value E corresponds at least substantially to the reference value D, a changeover can be effected in the aforedescribed manner, this changeover constituting a seventh step of the inventive method. As before described, the inventive method is a continuous process which is repeated constantly both before and after a changeover.

The invention described in the aforegoing with reference to a number of exemplifying embodiments thereof achieves the desired result at a comparatively low component cost and without unnecessary complexity. Naturally, the aforedescribed devices, arrangements and procedures may be varied and modified within the scope of the invention. The choice of components used in the two aforedescribed arrangements may also be varied while keeping the inventive concept intact. The delay of datastreams with the described rough and fine adjustments may also be varied in accordance with desired adjustment speeds, adjustment accuracies, etc. The invention can also be applied to phase-synchronize other types of datastreams, for instance ternary or analog datastreams, provided that these datastreams are first converted to binary datastreams by some suitable means. It is also possible to phase-synchronize more than two datastreams with the aid of an appropriate switching device prior to reading said streams into the control unit. The microprocessor included in the exemplifying embodiments may be helpful when storing and taking-out best earlier phase displacements, etc., for instance. The invention is thus not restricted to the aforedescribed and illustrated exemplifying embodiments thereof, since modifications can be made within the scope of the following claims.

What is claimed is:

1. A method of minimizing a phase difference between two binary datastreams and selecting the datastream with the best signal quality comprising the steps of:

(a) determining a reference value for the phase difference;
    (b) determining a numerical value representative of a total number of random samples of the binary amplitudes of the datastreams;
    (c) determining time points at which the random samples of the datastreams shall be taken, the time points corresponding in number to the numerical value;
    (d) taking, at each determined time point, a random sample from each of the datastreams;
    (e) generating a similarity signal by establishing which random samples that are taken at the same time points have one of mutually the same and mutually different binary amplitudes;
    (f) generating an actual value which corresponds to a proportion of the total number of random samples which at the determined time points have one of mutually the same and mutually different binary amplitudes;
    (g) comparing the actual value with the reference value to obtain a comparison result; and
    (h) in response to the comparison result, delaying the datastreams in relation to each other until the actual value and the reference value substantially agree with each other.

2. The method of claim 1, further comprising the steps of:
    (i) determining a signal quality of each datastream;
    (j) comparing the signal qualities of the datastreams; and
    (k) selecting the datastream having the better signal quality.

3. The method of claim 1, wherein the delaying step includes the steps of:
    delaying one of the datastreams through a predetermined number of bit times to obtain a starting value for said phase difference between the datastreams;
    making a rough adjustment by reducing the phase difference until the actual value at least substantially coincides with the reference value, the rough adjustment being carried out successively in delay intervals having durations of at most one bit time; and
    making a fine adjustment by phase-shifting the other datastream in increments smaller than the delay interval until the actual value optimally agrees with the reference value.

4. The method of claim 3, further comprising the steps of:
    (i) determining a signal quality of each datastream;
    (j) comparing the signal qualities of the datastreams; and
    (k) selecting the datastream having the better signal quality.

5. The method of claim 3, further comprising the step of:
    (i) maintaining the actual value in optimal agreement with the reference value by successively varying the delay of the other datastream in steps smaller than the delay interval such that optimal agreement is maintained.

6. The method of claim 5, further comprising the steps of:
    (j) determining a signal quality of each datastream;
    (k) comparing the signal qualities of the datastreams; and
    (l) selecting the datastream having the better signal quality.

7. A phase synchronizer for smoothly changing between two binary datastreams comprising:
    two variable delay units, each delay unit having an input connected to a respective datastream, a control input, and an output;
    means, having two inputs respectively connected to the outputs of the delay units, for switching between the datastreams, the switching means having an output for one of the datastreams; and
    a control unit having two inputs connected between the respective outputs of the delay units and the inputs of the switching means, and having two outputs, each output connected to a respective delay unit control input, wherein the control unit further includes:
        a logic unit comprising a memory space having inputs and outputs, wherein the inputs are connected to the control unit inputs, and a predetermined number of random samples of the datastreams are fed into and read from the memory space sequentially; the logic unit further comprising amplitude comparison means, having inputs connected to the outputs of the memory space, for comparing binary amplitudes of the random samples; and mean value means, having an input connected to an output of the amplitude comparison means, for forming an actual value which corresponds to a proportional number of the determined random samples which have one of the same and different binary amplitudes; and a regulating unit having an input on which a predetermined reference value is applied; the regulating unit further comprising a comparison circuit having two inputs to which a respective actual value and the reference value are applied and an output for a comparison result, the output of the comparison circuit being the basis of a signal from the control unit to one of the delay units for delaying one of the datastreams.

8. The phase synchronizer of claim 7, further comprising means, coupled to the datastreams, for sensing a signal quality of each datastream; and wherein the control unit sends to the switching means a control signal for switching from one datastream to the other when the sensing means senses a predetermined signal quality in the one datastream.

9. A method of minimizing a phase difference between two binary datastreams and selecting the datastream with the best signal quality comprising the steps of:

(a) determining the phase difference by the steps of: determining a reference value signal for the phase difference; determining a time interval for comparing the datastreams;

determining part-intervals in the time interval during which the datastreams have one of the same and different binary amplitudes;

producing an actual value signal corresponding to a summation of the part-intervals; and comparing the actual value signal with the reference value signal; and (b) delaying the datastreams in relation to each other until the actual value signal substantially agrees with the reference value signal whereby the phase difference is minimized.

10. The method of claim 9, further comprising the steps of:

(d) determining a signal quality of each datastream;

(e) comparing the signal qualities of the datastreams; and (f) selecting the datastream having the better signal quality.

11. The method of claim 9, wherein the delaying step includes the steps of:

delaying one of the datastreams through a predetermined number of bit times to obtain a starting value for a phase difference between the datastreams;

making a rough adjustment by reducing the phase difference until the actual value signal at least substantially coincides with the reference value signal, the rough adjustment being carded out successively in delay intervals having durations of at most one bit time; and making a fine adjustment by phase-shifting the other datastream in increments smaller than the delay interval until the actual value signal optimally agrees with the reference value signal.

12. The method of claim 11, further comprising the steps of:

(d) determining a signal quality of each datastream;

(e) comparing the signal qualities of the datastreams; and (f) selecting the datastream having the better signal quality.

13. The method of claim 11, further comprising the step of:

(d) maintaining the actual value signal in optimal agreement with the reference value signal by successively varying the delay of the other datastream in steps smaller than the delay interval such that optimal agreement is maintained.

14. The method of claim 13, further comprising the steps of:

(e) determining a signal quality of each datastream;

(f) comparing the signal qualities of the datastreams; and (g) selecting the datastream having the better signal quality.

15. A phase-synchronizer for smoothly changing between two binary datastreams comprising:

two variable delay units, each being coupled to a respective datastream and having a control input and an output;

means, having two inputs respectively connected to the outputs of the delay units, for switching between the datastreams, the switching means having an output for one of the datastreams; and a control unit having at least two inputs connected electrically between the respective outputs of the delay units and the inputs of the switch means, and having at least two outputs respectively connected to the control inputs of the delay units;

wherein the control unit includes an amplitude comparison circuit having an output and at least two inputs connected to respective inputs of the control unit, the amplitude comparison circuit comparing the binary amplitudes of the datastreams;

the control unit also includes a mean value circuit having an input connected to the output of the amplitude comparison circuit, the mean value circuit forming an actual value signal which corresponds to a proportional number of part-intervals during a predetermined time interval and during which the datastreams have one of the same and different binary amplitudes; and the control unit also includes an input for a predetermined reference value signal, and a comparison circuit to which the actual value signal and the reference value signal are applied on respective inputs, and from which a comparison result is used as a basis for a signal from one of the control unit outputs to one of the delay units which delays one of the datastreams.

16. The phase synchronizer of claim 15, further comprising means, coupled to the datastreams, for sensing a signal quality of each datastream sending to the switching means a control signal for switching from one datastream to the other when a predetermined signal quality in the one datastream is sensed.

* * * * *